US011375054B2

(12) United States Patent
Li et al.

(10) Patent No.: US 11,375,054 B2
(45) Date of Patent: Jun. 28, 2022

(54) MOBILE TERMINAL

(71) Applicant: VIVO MOBILE COMMUNICATION CO., LTD., Guangdong (CN)

(72) Inventors: Fengliang Li, Guangdong (CN); Jingjing He, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/134,608

(22) Filed: Dec. 28, 2020

(65) Prior Publication Data
US 2021/0120114 A1   Apr. 22, 2021

Related U.S. Application Data

(63) Continuation of application No. PCT/CN2019/094488, filed on Jul. 3, 2019.

(30) Foreign Application Priority Data

Jul. 11, 2018   (CN) .......................... 201810760788.4

(51) Int. Cl.
*H04M 1/03*   (2006.01)
*H04M 1/02*   (2006.01)

(52) U.S. Cl.
CPC ........... *H04M 1/035* (2013.01); *H04M 1/026* (2013.01)

(58) Field of Classification Search
CPC .............................. H04M 1/035; H04M 1/026
See application file for complete search history.

(56) References Cited

U.S. PATENT DOCUMENTS

| 5,909,490 A | 6/1999 | Sokolich et al. |
| 6,201,501 B1 | 3/2001 | Arkko et al. |
| 2003/0068987 A1 | 4/2003 | Dufosse et al. |
| 2006/0140433 A1* | 6/2006 | Castaneda ............... H04M 1/03 381/372 |

(Continued)

FOREIGN PATENT DOCUMENTS

| CN | 1420636 A | 5/2003 |
| CN | 101699829 | * 4/2010 |

(Continued)

OTHER PUBLICATIONS

International Preliminary Report on Patentability dated Jan. 21, 2021 issued in PCT/CN2019/094488.

(Continued)

*Primary Examiner* — Ankur Jain
*Assistant Examiner* — Angelica M Perez
(74) *Attorney, Agent, or Firm* — Brooks Kushman P.C.

(57) ABSTRACT

This disclosure discloses a mobile terminal, where the mobile terminal includes a housing (100) having an inner cavity (110) and a receiver (200) provided in the inner cavity (110). The inner cavity (110) includes a receiver front cavity (111) and a receiver rear cavity (112) that are isolated from each other. The receiver front cavity (111) and the receiver rear cavity (112) are respectively located on front and rear sides of the receiver (200) in a vibration direction of a diaphragm of the receiver (200). The housing (100) is provided with a first sound hole communicating with the receiver front cavity (111), and the housing (100) is provided with a second sound hole communicating with the receiver rear cavity (112).

9 Claims, 4 Drawing Sheets

(56) References Cited

U.S. PATENT DOCUMENTS

| | | | |
|---|---|---|---|
| 2017/0311061 A1 | 10/2017 | Miao et al. | |
| 2018/0270555 A1* | 9/2018 | Mao | ........................ H04R 1/10 |
| 2020/0366984 A1 | 11/2020 | Chen et al. | |
| 2021/0120114 A1 | 4/2021 | Li et al. | |

FOREIGN PATENT DOCUMENTS

| | | | |
|---|---|---|---|
| CN | 101699829 A | | 4/2010 |
| CN | 202334666 U | | 7/2012 |
| CN | 103581809 A | | 2/2014 |
| CN | 205596325 U | * | 2/2016 |
| CN | 105516869 A | | 4/2016 |
| CN | 205596325 U | | 9/2016 |
| CN | 106444995 A | | 2/2017 |
| CN | 106453715 A | | 2/2017 |
| CN | 106453756 A | | 2/2017 |
| CN | 205992985 U | | 3/2017 |
| CN | 107820178 A | | 3/2018 |
| CN | 108632419 B | | 11/2019 |
| WO | 2018082429 A1 | | 5/2018 |

OTHER PUBLICATIONS

First Office Action dated Jul. 29, 2019 issued in Chinese Application No. 201810760788.4.
Supplementary European Search Report, dated Jul. 26, 2021 Issued in EP19833040.

* cited by examiner

MOBILE TERMINAL

CROSS-REFERENCE TO RELATED APPLICATIONS

This application is a continuation application of International Application No. PCT/CN2019/094488 filed on Jul. 3, 2019, which claims priority to Chinese Patent Application No. 201810760788.4, filed in China on Jul. 11, 2018, both disclosures of which are incorporated herein by reference in their entireties.

TECHNICAL FIELD

This disclosure relates to the field of mobile terminal design technologies, and in particular, to a mobile terminal.

BACKGROUND

Mobile terminals (such as mobile phones) have become an indispensable part in people's lives. The current mobile terminals have many functions, and a call function is one of basic functions of the mobile terminals. A receiver is a basic component for implementing the call function, and the receiver is installed in an inner cavity of the mobile terminal. The receiver includes a coil and a diaphragm fastened to the coil. During the working process, when subjected to the Lorentz force in a magnetic field, the coil drives the diaphragm to vibrate. Vibration of the diaphragm pushes the air to vibrate, which in turn produces sound.

Generally, the receiver is disposed on the top of the inner cavity of the mobile terminal, and a front side of the diaphragm of the receiver faces towards a receiver front cavity of the mobile terminal, and a back side faces towards a receiver rear cavity. The receiver front cavity and the receiver rear cavity are sealed and isolated. During vibration of the diaphragm, the front side of the diaphragm may push air from the receiver front cavity into a sound hole of the mobile terminal to transmit sound. The back side of the diaphragm also pushes air in the receiver rear cavity. A low-frequency effect of the receiver is improved through vibration of the air in the receiver rear cavity, and the low-frequency effect of the receiver imposes a relatively great impact on hearing sense for the receiver. Therefore, absence of low frequency may result in harsh and hard sound emitted by the receiver.

As is known, a larger equivalent sound capacity of the receiver rear cavity indicates a better low-frequency effect of the receiver, and the equivalent sound capacity of the receiver rear cavity is affected by a volume of the receiver rear cavity. However, the current mobile terminals are generally becoming increasingly light and thin, resulting in an increasingly small volume of the receiver rear cavity and further leading to an increasingly small equivalent sound capacity of the receiver rear cavity. Obviously, this undoubtedly affects low-frequency performance of the receiver of the mobile terminal.

SUMMARY

A mobile terminal is provided, including a housing having an inner cavity and a receiver provided in the inner cavity. The inner cavity includes a receiver front cavity and a receiver rear cavity that are isolated from each other. The receiver front cavity and the receiver rear cavity are respectively located on front and rear sides of the receiver in a vibration direction of a diaphragm of the receiver. The housing is provided with a first sound hole communicating with the receiver front cavity, and the housing is provided with a second sound hole communicating with the receiver rear cavity.

BRIEF DESCRIPTION OF DRAWINGS

The accompany drawings described herein are intended to provide a further understanding of this disclosure and constitute a part of this disclosure. The example embodiments of this disclosure and descriptions thereof are intended to explain this disclosure, and do not constitute any improper limitation on this disclosure. In the drawings.

DESCRIPTION OF REFERENCE SIGNS

Figure 1:
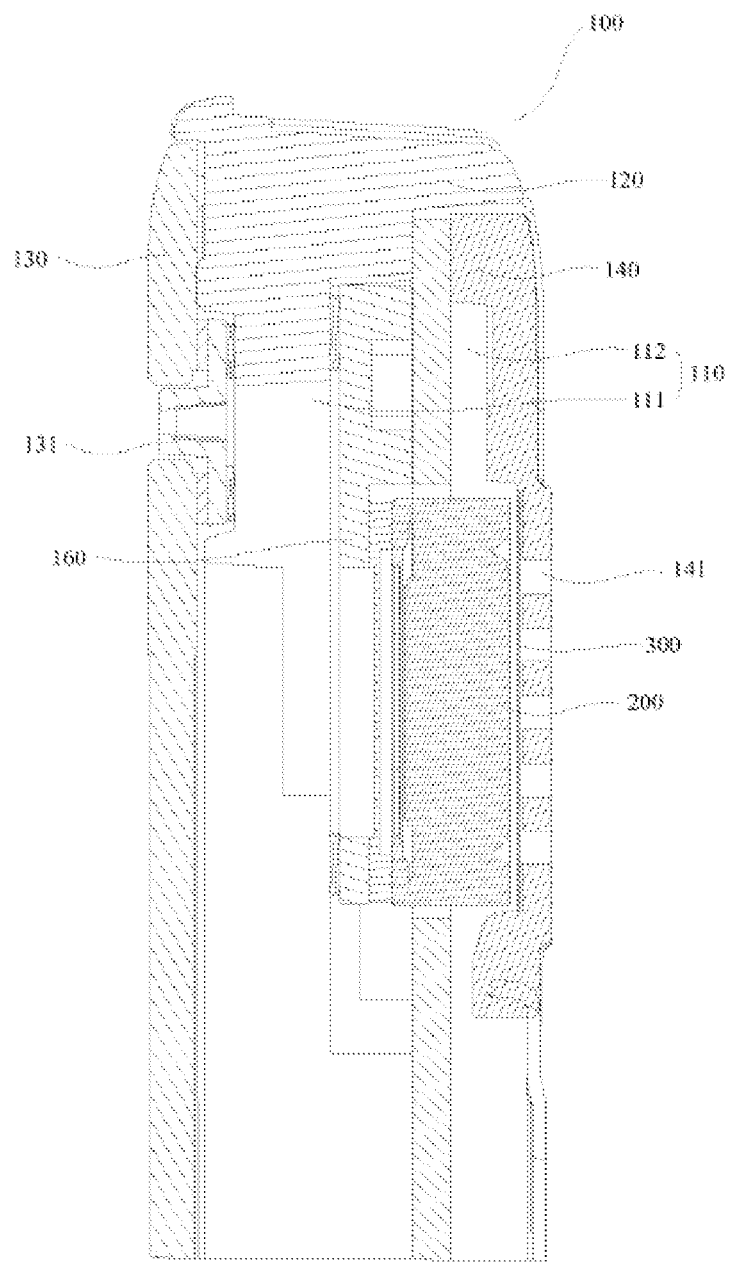
FIG. 1 is a schematic diagram of a partial structure of a first mobile terminal according to an embodiment of this disclosure.
Figure 2:
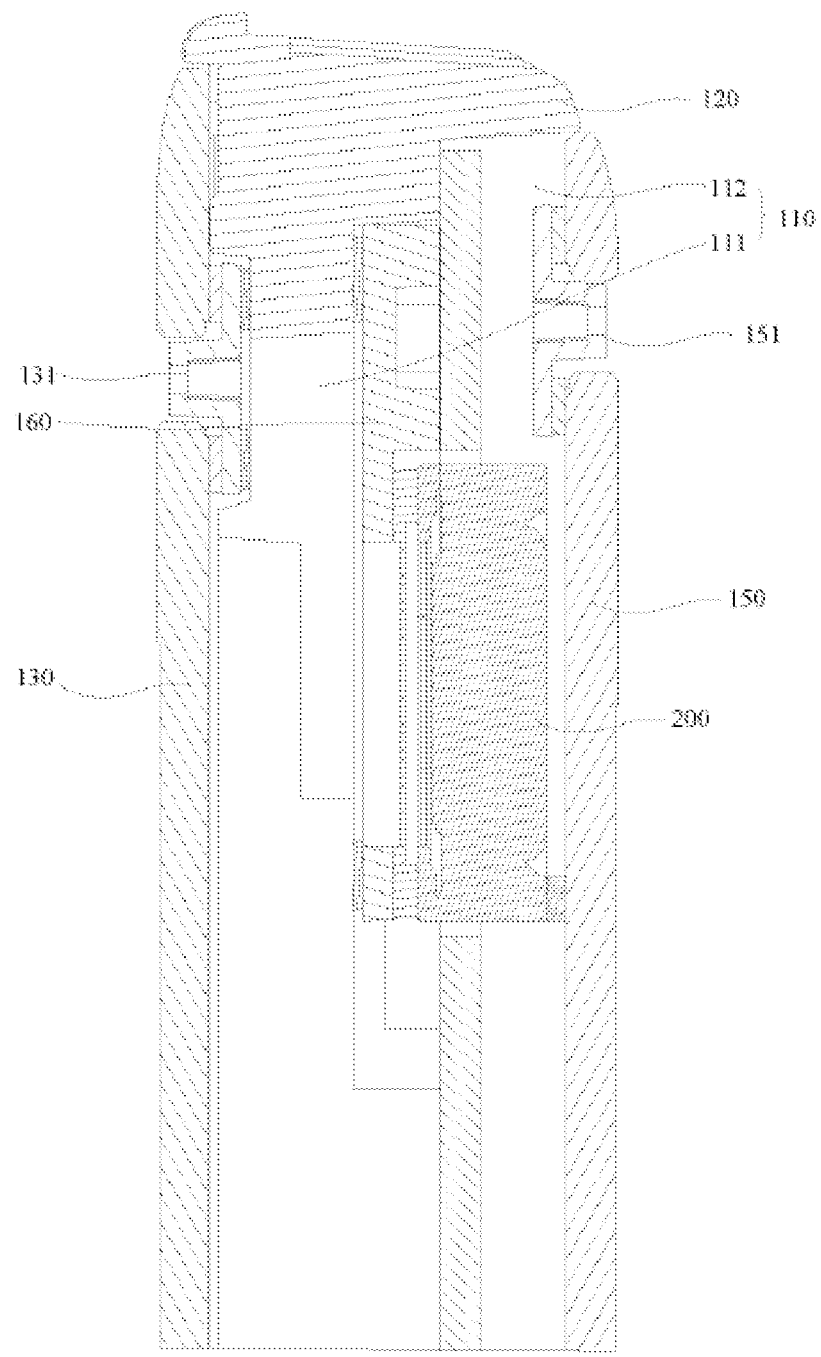
FIG. 2 is a schematic diagram of a partial structure of a second mobile terminal according to an embodiment of this disclosure.
Figure 3:
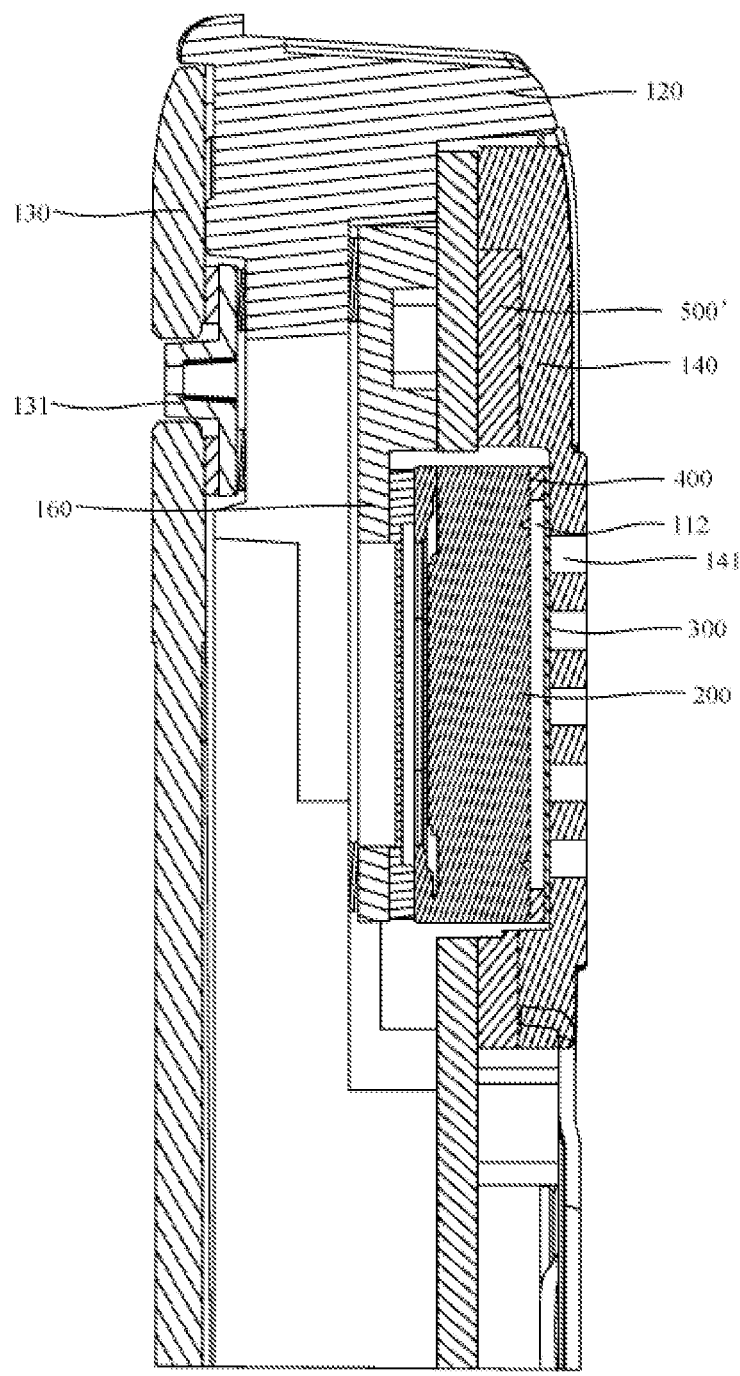
FIG. 3 is a schematic diagram of a partial structure of a third mobile terminal according to an embodiment of this disclosure.

100—housing, 110—inner cavity, 111—receiver front cavity, 112—receiver rear cavity, 120—middle frame, 130—first screen cover, 131—first receiver decoration cover, 140—battery cover, 141—second sound hole, 150—second screen cover, 151—second receiver decoration cover, 152—second sound hole, 160—main board upper cover, 200—receiver, 300—dust screen, 400—elastic pad, 500—seal ring, and 500'—seal ring.

DESCRIPTION OF EMBODIMENTS

To make the purpose, technical solutions, and advantages of this disclosure clearer, the following clearly and describes the technical solutions of this disclosure with reference to specific embodiments and the accompanying drawings in this disclosure. Apparently, the described embodiments are merely some rather than all of the embodiments of this disclosure. All other embodiments obtained by a person of ordinary skill in the art based on the embodiments of this disclosure without creative efforts shall fall within the protection scope of this disclosure.

The technical solutions disclosed in this embodiment of this disclosure are described in detail below with reference to the accompanying drawings.

Referring to FIG. 1 to FIG. 4, an embodiment of this disclosure discloses a mobile terminal, and the mobile terminal disclosed includes a housing 100 and a receiver 200.

The housing 100 is a peripheral housing of the mobile terminal. The housing 100 has an inner cavity 110, and the inner cavity 110 is configured to provide an installation space for other components of the mobile terminal. The receiver 200 is provided in the inner cavity 110 of the housing 100. Usually, the receiver 200 is secured in the inner cavity 110 of the housing 100 by using a connection structure or a connection element.

The inner cavity 110 includes a receiver front cavity 111 and a receiver rear cavity 112, where the receiver front cavity 111 and the receiver rear cavity 112 are isolated from each other. The receiver front cavity 111 and the receiver rear cavity 112 are respectively located on front and rear sides of the receiver 200 in a vibration direction of a diaphragm of the receiver 200. The receiver front cavity 111 and the receiver rear cavity 112 are sealed and isolated by using other components installed in the inner cavity 110.

It should be noted that the receiver front cavity 111 is a cavity facing towards a front side of the receiver 200 (a side surface on which the diaphragm is disposed), and the receiver rear cavity 112 is a cavity facing towards a back side of the receiver 200. Certainly, vibration of the diaphragm of the receiver causes vibration of air in the receiver front cavity 111 and the receiver rear cavity 112.

The housing 100 is provided with a first sound hole, and the first sound hole communicates with the receiver front cavity 111 and an external environment. The housing 100 is further provided with a second sound hole, and the second sound hole communicates with the receiver rear cavity 112 and the external environment.

At present, mobile terminals are becoming increasingly light and thin, and the receiver rear cavity 112 has an increasingly small volume, leading to a smaller equivalent sound capacity of the receiver rear cavity 112 and further resulting in a poor low-frequency effect of the receiver 200. In the mobile terminal disclosed in this embodiment of this disclosure, the housing 100 is provided with the second sound hole, and the second sound hole can communicate with the receiver rear cavity 112 and the external environment, so as to increase air flow in the receiver rear cavity 112, thereby improving an equivalent sound capacity of the receiver rear cavity 112 and achieving a purpose of optimizing the low-frequency effect.

Instead of using a method in which the equivalent sound capacity is improved by increasing the volume of the receiver back cavity 112, the mobile terminal disclosed in this embodiment of this disclosure improves the equivalent sound capacity by increasing the air flow in the receiver rear cavity 112, thereby ensuring that a relatively small volume remains for the receiver rear cavity 112. This is good for designing lighter and thinner mobile terminals under the premise that the low-frequency effect is not affected.

Certainly, during the actual working process, sound generated by the receiver 200 is transmitted through the first sound hole, and may also be transmitted through the second sound hole. Obviously, as a result, both sides of the mobile terminal have sound outlets, thereby undoubtedly facilitating use by the user.

In order to improve a flow effect of air driven in the receiver rear cavity 112, in an optional solution, the second sound hole may be provided at a part of the housing 100 opposite to the back side of the receiver 200. In this case, vibration of the diaphragm of the receiver 200 helps the air in the receiver rear cavity 112 flow out of the second sound hole. Specifically, a quantity of the second sound holes may be at least two, and the at least two second sound holes are evenly distributed, further optimizing the air flow effect.

During the actual working process, the first sound hole and the second sound hole need to communicate with the receiver front cavity 111 and the receiver rear cavity 112, respectively, and the receiver front cavity 111 and the receiver rear cavity 112 are located in the mobile terminal. In order to avoid affecting other components inside the inner cavity 110, the first sound hole and the second sound hole each are provided with a dust-proof component. Specifically, the dust-proof component may be a dust screen or a waterproof breathable film.

As mentioned above, the receiver front cavity 111 and the receiver rear cavity 112 are formed in a plurality of manners. In this embodiment of this disclosure, the housing 100 may include a middle frame 120 and a first screen cover 130 that is disposed at the top of the middle frame 120. A main board upper cover 160 is installed in the inner cavity 110, and the main board upper cover 160 is used for installation of a main board of the mobile terminal, and certainly may be also used for installation of other components for the mobile terminal. The receiver 200 is installed on the main board upper cover 160. The receiver 200, the main board upper cover 160, the middle frame 120, and the first screen cover 130 form an enclosed receiver front cavity 111, and the first screen cover 130 is provided with the first sound hole. The foregoing structure can make full use of the existing components of the mobile terminal to form the receiver front cavity 111.

The first screen cover 130 is usually a glass cover. In order to improve a decorative effect, the first screen cover 130 may include a first receiver decoration cover 131, and the first receiver decoration cover 131 is provided with the first sound hole. The first sound hole is provided in the first receiver decoration cover 131, better ensuring appearance performance of the mobile terminal.

On the basis of the housing 100 with the above structure, the housing 100 may further include a battery cover 140, where the battery cover 140, the middle frame 120, the main board upper cover 160, and the receiver 200 form an enclosed receiver rear cavity 112, and the battery cover 140 is provided with a second sound hole 141.

Certainly, for the mobile terminals with different structures, the receiver rear cavity 112 is formed by different components. The housing 100 may further include a second screen cover 150. The second screen cover 150, the middle frame 120, the main board upper cover 160, and the receiver 200 form the enclosed receiver rear cavity 112, and the second screen cover 150 is provided with a second sound hole 152. In this case, the mobile terminal is usually a dual-screen mobile terminal, and disposition of the foregoing second sound hole 152 can be better adapted to double-side operation of calling for a device.

Similarly, the second screen cover 150 may include a second receiver decoration cover 151, and the second receiver decoration cover 151 is provided with the second sound hole 152.

For a purpose of waterproofing, a dust screen 300 may be provided between the battery cover 140 or the second screen cover 150 and the receiver 200, and the dust screen 300 may cover the second sound hole 141 or the second sound hole 152.

The receiver 200 is a component in the related art, the front side of the receiver has better waterproof performance, and the rear side has poorer waterproof performance. Therefore, a better waterproof element needs to be provided for the rear side of the receiver 200. On this basis, in an optional solution, the waterproof breathable film may be disposed between the battery cover 140 or the second screen cover 150 and the receiver 200. The waterproof breathable film, is not water permeable but air permeable, so as to ensure that the air flow during the sound generation process is not affected. The dust screen 300 and the waterproof breathable film can be directly bonded to the battery cover 140 or the second screen cover 150 by using glue.

The mobile terminal disclosed in the embodiments of this disclosure may further include an elastic pad 400, where the elastic pad 400 is disposed on an edge of the rear side of the receiver 200 and is fixedly connected to the dust screen 300 or the waterproof and breathable film. The dust screen 300 or the waterproof breathable film and the elastic pad 400 are secured between the battery cover 140 or the second screen cover 150 and the receiver 200. The elastic pad 400 has good elasticity, and the elastic pad 400 is compressed after the mobile terminal is assembled, so as to indirectly implement more stable installation of the dust screen 300.

During specific implementation, the elastic pad 400 and the dust screen 300 or the waterproof breathable film may be glued to form a whole, and the formed whole is sandwiched between the battery cover 140 or the second screen cover 150 and the receiver 200. Certainly, one side of the whole formed by the elastic pad 400 and the dust screen 300 or the waterproof breathable film may be fixedly glued to the receiver 200 in advance, and the other side is pressed against the battery cover 140 or the second screen cover 150. Alternatively, one side of the whole formed by the elastic pad 400 and the dust screen 300 or the waterproof breathable film may be fixedly glued to the battery cover 140 or the second screen cover 150, and the other side is pressed against the receiver 200.

Figure 4:
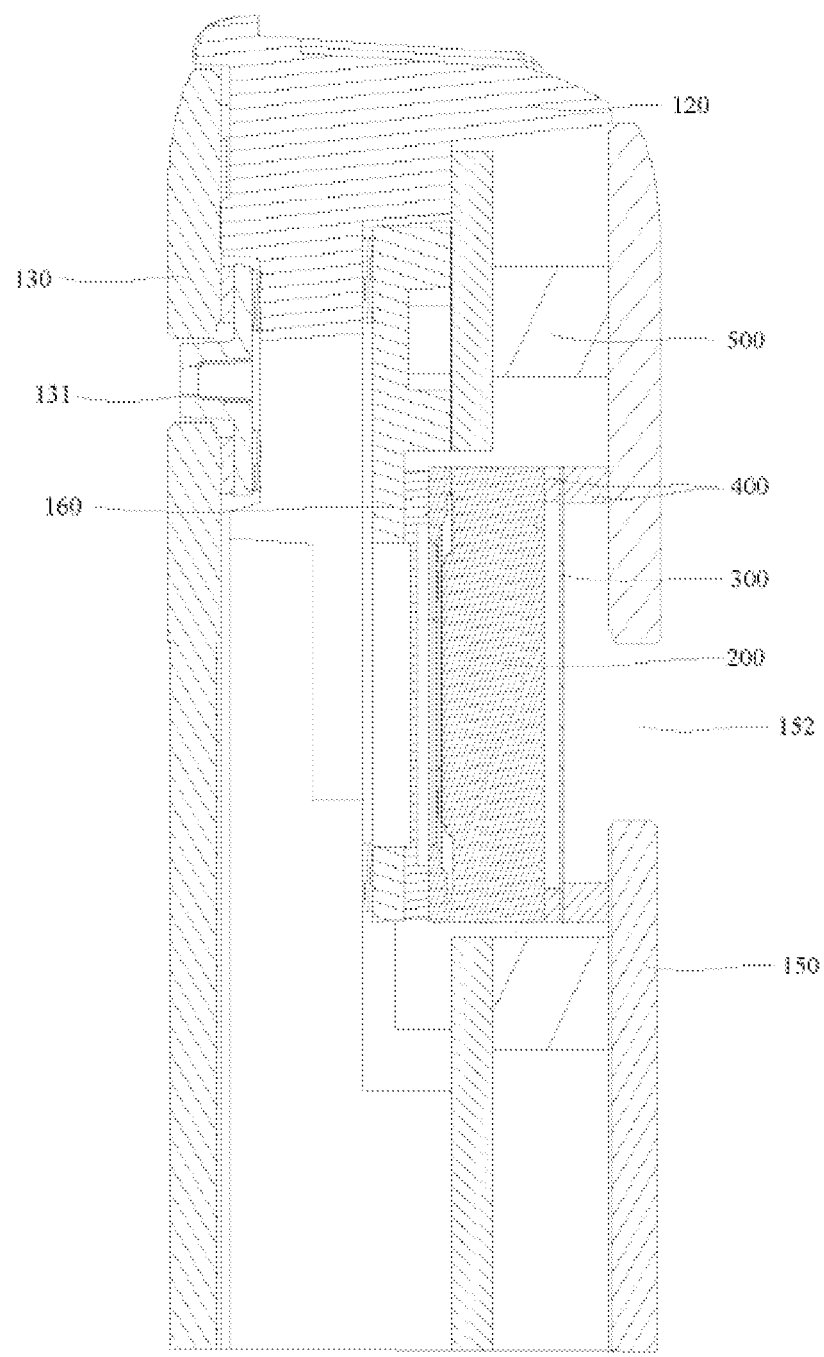
FIG. 4 is a schematic diagram of a partial structure of a fourth mobile terminal according to an embodiment of this disclosure.

As shown in FIG. 4, the mobile terminal disclosed in this embodiment of this disclosure may further include a sealing ring 500 (or a sealing ring 500'). The sealing ring 500 is disposed in the receiver rear cavity 112 and encircles the receiver 200. Encircling the receiver 200 with the sealing ring 500 reduces space in the receiver rear cavity 112, so that the air is all discharged from the receiver rear cavity 112 during vibration of the diaphragm. This solution can also reduce a difference between sound transmitted through the first sound hole and sound transmitted through the second sound hole, to obtain the same hearing sense on both sides of the mobile terminal. Certainly, disposition of the sealing ring 500 can further implement functions of sealing and protecting the receiver 200, preventing the receiver 200 from being affected by water and dust that enter the receiver rear cavity 112 from a joint between the middle frame 120 and the battery cover 140.

In a specific implementation, both the elastic pad 400 and the sealing ring 500 may be foam elements, the elastic pad 400 does not need to be used for sealing, and the sealing ring 500 provides the sealing function. The elastic pad 400 is mainly used for installing the dust screen 300 or the waterproof breathable film, and disposition of the elastic pad 400 does not block space between the dust screen 300 or the waterproof breathable film and the elastic pad 400 from communicating with the second sound hole.

The mobile terminal disclosed in this embodiment of this disclosure may be a mobile phone, a tablet computer, a wearable device, or the like, and a specific type of the mobile terminal is not limited in this embodiment of this disclosure.

The foregoing embodiments of this disclosure focus on differences between various embodiments. The embodiments can be combined to form a preferred embodiment provided that the different optimization features between the embodiments are not contradictory. For brevity of the specification, details are not described herein.

The foregoing descriptions are only embodiments of this disclosure, but are not intended to limit this disclosure. For a person skilled in the art, this disclosure may be subject to various variations and changes. Any modifications, equivalent replacements, and improvements made without departing from the spirit and principle of this disclosure shall fall within the protection scope of the claims of this disclosure.

What is claimed is:

1. A mobile terminal, comprising a housing having an inner cavity and a receiver provided in the inner cavity, wherein the inner cavity comprises a receiver front cavity and a receiver rear cavity that are isolated from each other; the receiver front cavity and the receiver rear cavity are respectively located on front and rear sides of the receiver in a vibration direction of a diaphragm of the receiver; the housing is provided with a first sound hole communicating with the receiver front cavity; and the housing is provided with a second sound hole communicating with the receiver rear cavity;

wherein the mobile terminal further comprises a sealing ring, wherein the sealing ring is disposed in the receiver rear cavity and encircles the receiver, the receiver rear cavity is divided by the sealing ring into a first space enclosed by the sealing ring and a second space surrounding the first space, and the first space is smaller than the receiver rear cavity wherein a surface of the sealing ring is in contact with the housing in the vibration direction of the diaphragm, and an orthogonal projection of the sealing ring on to a same plane perpendicular to the vibration direction of the diaphragm overlays with an orthographic projection of the receiver onto the same plane.

2. The mobile terminal according to claim 1, wherein the second sound hole is provided at a part of the housing opposite to a back side of the receiver.

3. The mobile terminal according to claim 2, wherein a quantity of the second sound holes is at least two, and the at least two second sound holes are evenly distributed.

4. The mobile terminal according to claim 1, wherein the housing comprises a middle frame and a first screen cover disposed at the top of the middle frame; a main board upper cover is installed in the inner cavity; the receiver is installed on the main board upper cover; the receiver, the main board upper cover, the middle frame, and the first screen cover form an enclosed receiver front cavity; and the first screen cover is provided with the first sound hole.

5. The mobile terminal according to claim 4, wherein the first screen cover comprises a first receiver decoration cover, and the first receiver decoration cover is provided with the first sound hole.

6. The mobile terminal according to claim 4, wherein the housing further comprises a battery cover or a second screen cover installed at the bottom of the middle frame; the battery cover or the second screen cover, the middle frame, the main board upper cover and the receiver form an enclosed receiver rear cavity; and the battery cover or the second screen cover is provided with the second sound hole.

7. The mobile terminal according to claim 6, wherein the second screen cover comprises a second receiver decoration cover, and the second receiver decoration cover is provided with the second sound hole.

8. The mobile terminal according to claim 6, wherein a dust screen or a waterproof breathable film is provided between the battery cover or the second screen cover and the receiver, and the dust screen or the waterproof and breathable film covers the second sound hole.

9. The mobile terminal according to claim 8, further comprising an elastic pad, wherein the elastic pad is disposed on an edge of the back side of the receiver and fixedly connected to the dust screen or the waterproof breathable film, and the dust screen or the waterproof breathable film and the elastic pad are secured between the battery cover or the second screen cover and the receiver.

* * * * *